(12) United States Patent
Kim et al.

(10) Patent No.: US 7,252,908 B2
(45) Date of Patent: Aug. 7, 2007

(54) ORGANIC ELECTROLYTIC SOLUTION AND LITHIUM BATTERY USING THE SAME

(75) Inventors: Hansu Kim, Seoul (KR); Myung-Dong Cho, Hwaseong-si (KR); Hyo-Sug Lee, Yongin-si (KR); Boris A. Trofimov, Irkutsk (RU)

(73) Assignee: Samsung SDI Co., Ltd., Suwon (KR)

( * ) Notice: Subject to any disclaimer, the term of this patent is extended or adjusted under 35 U.S.C. 154(b) by 514 days.

(21) Appl. No.: 10/949,519

(22) Filed: Sep. 27, 2004

(65) Prior Publication Data

US 2005/0089758 A1    Apr. 28, 2005

(30) Foreign Application Priority Data

Oct. 22, 2003    (KR)    ............. 10-2003-0073832

(51) Int. Cl.
*H01M 10/40*    (2006.01)
(52) U.S. Cl. ............. 429/328; 429/329; 252/62.2
(58) Field of Classification Search ............... None
See application file for complete search history.

(56) References Cited

U.S. PATENT DOCUMENTS 6,255,021 B1 *    7/2001    Kusumoto et al. ......... 429/328
2003/0070283 A1 *    4/2003    Webber ................ 29/623.1

OTHER PUBLICATIONS

Trofimov, B. et al., "Triethyl 2-(1,3-oxazolidin-3-yl)ethyl orthosilicate as a new type electrolyte additive for lithium-ion batteries with graphite anodes," J. Power Sources 147, pp. 260-263, Mar. 2005.*

* cited by examiner

*Primary Examiner*—Jonathan Crepeau
(74) *Attorney, Agent, or Firm*—H.C. Park & Associates, PLC

(57) ABSTRACT

The present invention relates to an electrolytic solution for a lithium battery and a lithium battery using the same. The organic electrolytic solution includes a lithium salt, a mixed organic solvent comprising a high dielectric constant solvent and a low boiling-point solvent, and an additive. The additive used in the electrolytic solution is a heterocyclic compound of Formula (1):

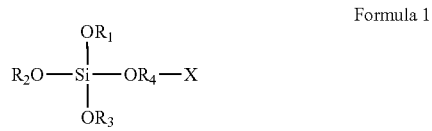

Formula 1 where $R_1$, $R_2$ and $R_3$ may each independently be a C1-C10 linear or branched alkyl group; $R_4$ may be a C1-C10 linear or branched alkylene group; X may be a heterocyclic ring containing N and O whereby a tetraalkyl orthosilicate functional group may be linked to N. The lithium battery using the organic electrolytic solution of the present invention is highly reliable and maintains a constant thickness during a charge/discharge cycle.

11 Claims, No Drawings

ORGANIC ELECTROLYTIC SOLUTION AND LITHIUM BATTERY USING THE SAME

CROSS REFERENCE TO RELATED APPLICATION

This application claims priority to Korean Patent Application No. 2003-73832, filed on Oct. 22, 2003, in the Korean Intellectual Property Office, the disclosure of which is incorporated herein in its entirety by reference.

FIELD OF THE INVENTION

The present invention relates to an electrolytic solution for a lithium battery and a lithium battery using the same. Specifically, the electrolytic solution of the present invention results in a lithium battery having improved stability against reductive decomposition, reduced irreversible capacity in a first cycle, improved charge/discharge efficiency, and a longer lifetime.

BACKGROUND OF THE INVENTION

A lithium battery may be used as a power source for portable electronic devices such as mobile phones, personal digital assistants (PDAs), laptop computers, and other general electronic devices. Rechargeable lithium secondary batteries have several advantages over other types of batteries. For example, rechargeable lithium secondary batteries have three times the energy density per unit weight as Pb storage batteries, Ni—Cd batteries, Ni—H batteries, and Ni—Zn batteries. In addition, rechargeable lithium secondary batteries may be charged in a short time.

Generally, lithium-ion batteries comprise a positive electrode, a negative electrode, and an electrolyte. Examples of positive active materials include oxides of transition metal compounds and lithium, such as $LiNiO_2$, $LiCoO_2$, $LiMn_2O_4$, $LiFePO_4$, $LiNi_xCo_{1-x}O_2$ (x=1 or 2), $Ni_{1-x-y}Co_xMn_yO_2$ ($0 \leq x \leq 0.5$ and $0 \leq y \leq 0.5$). Examples of negative active materials include lithium metal, lithium metal alloy, carbon materials, and graphite materials.

Electrolytes may be divided into liquid electrolytes and solid electrolytes. There are several disadvantages to using liquid electrolytes in batteries. In particular, the outflow of the liquid electrolyte from the battery may result in a fire and the evaporation of the liquid electrolyte from the battery may result in the actual destruction of the battery. In order to overcome these disadvantages, solid electrolytes may be used. In general, solid electrolytes offer several advantages over liquid electrolytes because they are unlikely to leak and are more easily processed. Solid polymer electrolytes may be categorized into full solid types and gel types. Specifically, a full solid-type electrolyte does not contain an organic electrolytic solution whereas a gel-type electrolyte contains an organic electrolytic solution.

In general, a conventional aqueous electrolytic solution is not suitable for a lithium battery because a negative lithium electrode reacts vigorously with an aqueous electrolytic solution at high working voltages. Therefore, in lithium batteries, it is desirable to use an organic electrolytic solution that includes a lithium salt and an organic solvent. In particular, it is preferable to use an organic solvent having the properties of a high ionic conductivity, a high dielectric constant and a low viscosity. It is, however, very difficult to obtain a single organic solvent having all of these properties. As a result, either a mixed solvent composed of an organic solvent having a high dielectric constant and an organic solvent having a high dielectric constant; or a mixed solvent composed of an organic solvent having a high dielectric constant and an organic solvent having low viscosity is used in lithium batteries.

In order to produce an organic solvent with high ionic conductivity, U.S. Pat. Nos. 6,114,070 and 6,048,637 disclose mixed solvents comprising a linear carbonate and a cyclic carbonate, e.g., dimethyl carbonate or diethyl carbonate and ethylene carbonate or propylene carbonate. In general, mixed solvents may be used in batteries that operate at temperatures of 120° C. or less. If the battery reaches a temperature higher than 120° C., however, the battery may swell due to vapour pressure generated by gas. As a consequence, the swelled battery results in the failure of the battery operation.

Furthermore, U.S. Pat. Nos. 5,352,548, 5,712,059, and 5,714,281 disclose electrolytes having vinylene carbonate as a main organic solvent at a concentration of 20% or more. In these cases, however, the charge/discharge characteristics and the high-rate characteristics of the batteries are significantly reduced because vinylene carbonate has a lower dielectric constant than ethylene carbonate, propylene carbonate, or γ-butyrolactone. Alternatively, U.S. Pat. No. 5,626,981 discloses the use of vinylene carbonate as an additive in an electrolyte in order to form a surface electrolyte interface (SEI) on the surface of positive electrodes during an initial charge/discharge cycle. A vinyl-based compound such as vinyl acetate is used as an additive in Japanese Patent Laid-open Publication No. 2001-223154.

The use of an electrolyte comprising an electrochemical anionic polymerizable monomer to form a polymer film on the surface of a carbonaceous negative material during initial charging is disclosed by U.S. Pat. No. 6,291,107. In order to prevent the decomposition of the electrolytic solution, an electrochemical anionic polymerizable monomer may be used in the electrolytic solution, which facilitates the formation of a polymer film on the surface of a carbonaceous negative material. As a result, the thickness of the battery may be maintained within an acceptable range, regardless of the number of charge/discharge cycles of the battery. Consequently, reliability, charge/discharge efficiency and the lifetime of the battery may be improved. The polymer film, which is formed by anionic polymerization, however, causes an increase in the resistance of electrodes. Therefore, if a battery is charged at a high rate, its capacity and low temperature characteristics may deteriorate.

Therefore, in order to overcome the aforementioned problems, the present invention is directed to blending a specific additive in the electrolyte solution. Accordingly, the present invention provides for improved charge-discharge efficiency during a repeated charge-discharge process while providing a high voltage and a high energy density.

SUMMARY OF THE INVENTION

The present invention is directed to an organic electrolytic solution comprising a lithium salt and a mixed organic solvent composed of a high dielectric constant solvent and a low boiling-point solvent. Furthermore the organic electrolytic solution comprises an additive that comprises a heterocyclic compound of Formula (1):

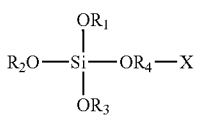

Formula 1 where $R_1$, $R_2$ and $R_3$ may each independently be a C1-C10 linear or branched alkyl group; where $R_4$ may be a C1-C10 linear or branched alkylene group; and where X may be a heterocyclic ring containing N and O where a tetraallkyl orthosilicate functional group may be linked to N.

The present invention is also related to a lithium battery which comprises a positive electrode, a negative electrode, and an organic electrolytic solution containing a lithium salt, a mixed organic solvent of a high dielectric constant solvent and a low boiling-point. Furthermore, the organic electrolytic solution further comprises an additive that may be a heterocyclic compound of Formula (1) where X may be a heterocyclic ring comprising N and O having a tetraallkyl orthosilicate functional group linked to N.

The thickness of the lithium battery using the organic electrolytic solution of the present invention may be maintained within an allowable range during a charge/discharge cycle. Thus, the lithium battery may be highly reliable.

DETAILED DESCRIPTION OF THE INVENTION

According to an embodiment of the present invention, an organic electrolytic solution of the present invention comprises a lithium salt and a mixed organic solvent composed of a high dielectric constant solvent and a low boiling-point solvent. Additionally, the organic electrolytic solution may also comprise an additive. The additive may be a heterocyclic compound of Formula (1):

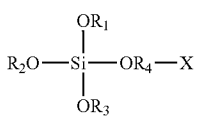

Formula 1 where $R_1$, $R_2$ and $R_3$ may each independently be a C1-C10 linear or branched alkyl group; where $R_4$ may be a C1-C10 linear or branched alkylene group; and where X may be a heterocyclic ring containing N and O where a tetraallkyl orthosilicate functional group may be linked to N.

In one embodiment, the tetraalkyl orthosilicate functional group may modify the surface of graphite in order to suppress side reactions between the electrolyte and the surface of graphite. Consequently, the suppression of side reactions may result in the improved reliability of a battery. In addition, the heterocyclic ring containing N and O may be easily reduced and dissociated by electrons, which are supplied during charging, and thus an organic electrolytic solution may be less likely to react with the surface of an electrode.

In a further embodiment, in Formula (1), $R_1$, $R_2$ and $R_3$ may each comprise independently a C1-C10 alkyl group, and in particular, $R_1$, $R_2$, and $R_3$ may each independently comprise a C1-C5 alkyl group. Furthermore, $R_4$ may be a C1-C10 alkylene group. Specifically, $R_4$ may comprise a C1-C3 alkylene group. The tetraalkyl orthosilicate functional group may be bonded to N of the heterocyclic ring containing N and O. Further yet, the X of Formula (1) may be a heterocyclic ring containing N and O. Specifically, the X of formula (1) may be derived from compounds, which include, but are not limited to, oxazole, isoxazole, oxazoline, oxazolanone, oxazolane, and oxazolone. According to an embodiment of the present invention, the compound of Formula (1) may be prepared by reacting a tetraalkyl orthosilicate compound with a heterocyclic compound containing N and O.

In the organic electrolytic solution according to embodiments of the present invention, the amount of the mixed organic solvent may be in the range of about 50% to about 99.9% by volume. Specifically, the amount of mixed organic solvent may be in the range of about 80% to about 99% by volume based on the total volume of the organic electrolytic solution.

The amount of the additive may be in the range of about 0.1 parts to about 1 part by volume, and in particular, may be in the range of about 0.25 parts to about 1 part by volume based on the total volume of the organic electrolytic solution. If the amount of the additive is outside of this range, the battery may swell or the charge/discharge characteristics of the battery may be degraded.

In further embodiments of the present invention, the high dielectric constant solvent and the low boiling-point solvent may be mixed in a ratio of about 40:60 to about 50:50 parts by volume. The high dielectric constant solvent may comprise cyclic carbonate or γ-butyrolacetone. Examples of the cyclic carbonate may include, but are not limited to, ethylene carbonate, propylene carbonate, and butylene carbonate. The low boiling-point solvent may comprise a linear carbonate, dimethoxyethane, diethoxyethane, or a fatty acid ester derivative. Examples of the linear carbonate include, but are not limited to, dimethyl carbonate, ethylmethyl carbonate, diethyl carbonate, and dipropyl carbonate.

Any lithium salt that is commonly used in lithium batteries may be used in embodiments of the present invention. The lithium salt may comprise at least one compound such as, for example, $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$. Furthermore, the lithium salt may be included in the organic electrolytic solution and may have a concentration of about 0.5 M to about 2 M.

A lithium battery including the organic electrolytic solution according to an embodiment of the present invention and a method of manufacturing the lithium battery will now be described. A lithium battery according to an embodiment of the present invention comprises a positive electrode, a negative electrode, and an organic electrolytic solution. The electrolytic solution of the present invention may comprise a lithium salt, a mixed organic solvent comprised of a high dielectric constant solvent and a low boiling-point solvent. Additionally, the electrolytic solution may also comprise an additive. The additive may be a heterocyclic compound of Formula (1):

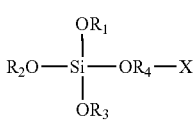

Formula 1 where $R_1$, $R_2$ and $R_3$ may each independently be a C1-C10 linear or branched alkyl group; where $R_4$ may be a C1-C10 linear or branched alkylene group; and where X may be a heterocyclic ring containing N and O where a tetraalkyl orthosilicate functional group may be linked to N.

The present invention may be applied to any type of lithium battery. For example, the present invention may be directed to lithium first batteries as well as lithium secondary batteries, such as lithium-ion batteries and lithium-ion polymer batteries.

A method of fabricating a lithium battery according to an embodiment of the present invention will now be described. In an embodiment, a positive active material, a conductor, a binder, and a solvent may be mixed to create a positive active material composition. The positive active material composition may be coated on an aluminium current collector, and subsequently dried to prepare a positive electrode plate. Alternately, the positive electrode plate may be prepared by casting the positive active material composition onto a separate support. The composition may then be detached from the separate support, and subsequently laminated onto an aluminium current collector. The positive active material may comprise a lithium-containing metal oxide such as $LiCoO_2$, $LiMn_xO_{2x}$, and $LiNi_{1-x}Mn_xO_{2x}$ (x=1 or 2), or $Ni_{1-x-y}Co_xMn_yO_2$ ($0 \leq x \leq 0.5$ and $0 \leq y \leq 0.5$).

In another embodiment, the conductor may be carbon black and the binder may comprise vinylidenefluoride/hexafluoropropylene copolymer, polyvinylidenefluoride, polyacrylonitirile, polymethylmethacrylate, polytetrafluoro ethylene, a mixture thereof, or a styrene butadiene rubber-based polymer. Examples of the solvent include, but are not limited to, N-methylpyrrolidone, acetone, and water. In the present embodiment, amounts of the positive active material, the conductor, the binder, and the solvent may be the same as those used in conventional methods of manufacturing of lithium batteries.

The process for manufacturing a negative electrode plate may be the same as that for the positive electrode plate. A negative active material, a conductor, a binder, and a solvent may be mixed together to create a negative active material composition. A Cu current collector may be directly coated with the negative active material composition to obtain a negative electrode plate. Alternately, the negative active material composition may be cast onto a separate support. The negative active material composition may then be detached from the support and subsequently a Cu current collector may be laminated with the detached negative active material film, thereby preparing a negative electrode plate.

Examples of the negative active material of the present invention may include, but are not limited to, lithium metal, lithium alloy, carbonaceous materials, and graphite. A negative active material composition may include the same conductor, binder, and solvent as used in the manufacturing process for the positive electrode. If needed, a plasticizer, which is used to form pores inside an electrode plate, may be added to the positive active material composition or to the negative active material composition.

Any separator used in common lithium batteries may be used in the present embodiment. In particular, a separator may have low resistance to the migration of ions in an electrolyte and an excellent electrolyte-retaining ability. Specific examples of the separator include glass fiber, polyester, Teflon, polyethylene, polypropylene, polytetrafluoroethylene (PTFE), and a combination thereof, which may be in non-woven or woven fabric form. In particular, a separator composed of polyethylene, polypropylene, or the like, which can be rolled, may be used for a lithium ion battery. Moreover a separator that can retain a large amount of an organic electrolytic solution may be used for a lithium-ion polymer battery.

A method of manufacturing the separator will now be described. In one embodiment, a polymer resin, a filler, and a solvent may be mixed together to create a separator composition. The separator composition may be coated onto an upper portion of an electrode, and then dried to form a separator film. Alternately, the separator composition may be cast onto a support, dried, detached from the support, and laminated on an upper portion of an electrode, thereby preparing a separator film.

Any polymer resin that is commonly used for binders of electrode plates may be used in the present embodiment. Examples of the polymer resin include, but are not limited to, vinylidenefluoride/hexafluoropropylene copolymer, polyvinylidenefluoride, polyacrylonitrile, polymethylmethacrylate, and a combination thereof. In particular, the polymer resin may be a vinylidenefluoride/hexafluoropropylene copolymer, in which the amount of hexafluoropropylene is in the range of about 8% to about 25% by weight.

The separator may be interposed between the positive electrode plate and the negative electrode plate to form an electrode assembly. The electrode assembly may be wound or folded, and then sealed in a cylindrical or rectangular battery case. The organic electrolytic solution according to an embodiment of the present invention may be injected into the battery case to complete the lithium-ion battery. In an alternate embodiment, the electrode assemblies may be stacked upon one another to form a bi-cell structure, soaked in an organic electrolytic solution, and sealed in a pouch to complete the lithium ion polymer battery.

The present invention will be described in greater detail with reference to the following examples. The following examples are for illustrative purposes and are not intended to limit the scope of the invention.

EXAMPLES

Specific Example 1

95% $LiCoO_2$ by weight, 2% PVDF by weight as a binder, and 3% carbon conductor by weight were mixed. 100 ml of N-methylpyrrolidone (NMP) and ceramic balls were added to the mixture. The resulting mixture was stirred in a 200 ml plastic bottle for 10 hours. The resultant was cast on a 15 μm thick aluminium foil using a 250 μm-spaced doctor blade to obtain a positive electrode. The positive electrode was dried in an oven at a temperature of 110° C. for about 12 hours to remove the NMP. The resulting positive electrode was roll-pressed to a thickness of 95 μm.

96% graphite-based powder by weight, 4% PVDF by weight, and 100 ml of NMP were mixed. The mixture was stirred for about 10 hours in the presence of ceramic balls. The resultant was cast on a 19 μm thick copper foil using a 300 μm-spaced doctor blade to prepare a negative electrode. The negative electrode was dried in an oven at a temperature of 90° C. for about 10 hours to remove the NMP. The resulting negative electrode was roll-pressed to a thickness of 120 μm.

A separator according to an embodiment of the present invention was composed of a 20 μm thick polyethylene/polypropylene microporous membrane (Hoechst Celanese, Charlotte, N.C.).

Two kinds of negative electrodes were prepared using the above-mentioned method. The first negative electrode was a graphite-based active material having a small specific surface area, and the second negative electrode was a graphite-based active material having a large specific surface area. Each negative electrode, the positive electrode, and the separator were used to form electrode assemblies. Although the use of the graphite-based active material having a large specific surface area may improve capacity and battery characteristics, side reactions nevertheless take place, thus deteriorating charge/discharge efficiency. In order to overcome this problem, an additive may be added to the electrolytic solution.

To prepare an electrolytic solution, an additive, triethyl 2-(1,3-oxazolan-3-yl) ethyl orthosilicate, was added to a mixed organic solvent composed of 30% ethylene carbonate by volume, 10% propylene carbonate by volume, and 60% ethylmethylcarbonate by volume. 0.25 parts of the additive by volume was added with respect to the total volume of the mixed organic solvent. 1M $LiPF_6$ was prepared as a lithium salt. Coin type cells were manufactured by using a positive electrode (2.5×4 $cm^2$), a negative electrode having a small specific surface area, and an electrolytic solution. Following, a constant current (60 mA/g) and a constant potential (1 mV) were applied to charge the coin type cells. Finally, the coin type cells were discharged to 1.5V. This charge/discharge cycle was repeated 10 times.

Specific Example 2

Organic electrolytic solutions and batteries were manufactured in the same manner as described in Example 1, except that amount of the additive, triethyl 2-(1,3-oxazolan-3-yl) ethyl orthosilicate, was 0.5 parts by volume.

Specific Example 3

Organic electrolytic solutions and batteries were manufactured in the same manner as described in Example 1, except that amount of the additive, triethyl 2-(1,3-oxazolan-3-yl) ethyl orthosilicate, was 1 part by volume.

Specific Example 4

30% ethylene carbonate by volume, 10% propylene carbonate by volume, and 60% ethylmethyl carbonate by volume were mixed to create an organic solvent. The organic electrolytic solution in this example includes only the mixed organic solvent, but does not include an additive. A graphite-based negative electrode having a small specific surface area was prepared. 1M $LiPF_6$ was prepared as a lithium salt. Using the organic electrolytic solution, the lithium salt, the negative electrode, and the positive electrode, a battery was manufactured in the same manner as described in Example 1.

Specific Example 5

2 parts vinylene carbonate by volume was added to a mixed organic solvent composed of 30% ethylene carbonate by volume, 10% propylene carbonate by volume, and 60% ethylmethyl carbonate by volume to create an organic electrolytic solution. The organic electrolytic solution, 1.0M $LiPF_6$ as a lithium salt, a graphite-based negative electrode having a small specific surface area, and the positive electrode were used to fabricate a battery in the same manner as described in Example 1. The battery was then subjected to the charge/discharge test.

Specific Example 6

2 parts triethyl 2-(1,3-oxazolan-3-yl) ethyl orthosilicate by volume was added to a mixed organic solvent composed of 30% ethylene carbonate by volume, 10% propylene carbonate by volume, and 60% ethylmethyl carbonate by volume to create an organic electrolytic solution. The organic electrolytic solution, 1.0M $LiPF_6$ as a lithium salt, a graphite-based negative having a small specific surface area, and the positive electrode were used to fabricate a battery in the same manner as described in Example 1. The battery was then subjected to the charge/discharge test.

The ionic conductivities of the organic electrolytic solutions of Examples 1-6 were measured at 10 kHz using an impedance analyzer (Solartron 1260, Solartron Analytical, Houston, Tex.). The results are summarized in Table 1.

Table 1 illustrates the initial charge/discharge efficiency of the batteries prepared in Examples 1-6. Referring to Table 1, the charge/discharge efficiency was higher when an additive was added to the organic electrolytic solution, compared to Example 4. Therefore, the additive has the same effect as vinylene carbonate, a conventional additive. Furthermore, the increase of charge/discharge efficiency implies that there is a decrease in side reactions, such as the decomposition of the electrolytic solution. Accordingly, the use of the additive results in less side reactions and has an effect on maintaining the thickness of the battery.

TABLE 1

|  | Amount of Additive (parts by volume) | Initial charge/discharge efficiency (%) |
|---|---|---|
| Example 1 | 0.25 | 93.7 |
| Example 2 | 0.50 | 93.5 |
| Example 3 | 1 | 93 |
| Example 4 | 0 | 92.5 |
| Example 5 | vinylene carbonate2 | 93.5 |
| Example 6 | 2 | 92.4 |

In an organic electrolytic solution according to an embodiment of the present invention and a lithium battery using the same, the lithium battery has improved stability against reductive decomposition, reduced irreversible capacity in a first cycle, improved charge/discharge efficiency, and a longer lifetime. Moreover, the battery does not swell beyond a predetermined thickness after formation and standard charging at room temperature, and thus reliability of the battery is high. Even when the lithium battery swells to a greater amount at a high temperature, the capacity of the lithium battery is high enough for practical applications due to the battery's high recovery capacity. In general, a recovery capacity is measured to determine whether a battery could return to its original capacity after being at high temperatures. A lithium battery according to an embodiment of the present invention maintains a thickness within an allowable range during a charge/discharge cycle, contrary to conventional batteries, which have thicknesses that become prominently thicker.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An organic electrolytic solution, comprising
a lithium salt;
a mixed organic solvent comprising a high dielectric constant solvent and a low boiling-point solvent, and an additive;
wherein said additive comprises a heterocyclic compound of Formula (1):

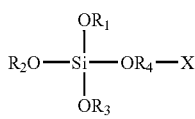

Formula 1 where $R_1$, $R_2$ and $R_3$ are each independently a C1-C10 linear or branched alkyl group, where $R_4$ comprises a C1-C10 linear or branched alkylene group, where X is a heterocyclic ring containing N and O, and where a tetraalkyl orthosilicate functional group is linked to the N.

2. The organic electrolytic solution of claim 1, wherein the X is derived from a compound selected from a group consisting of oxazole, isoxazole, oxazoline, oxazolanone, oxazolane, and oxazolone.

3. The organic electrolytic solution of claim 1, wherein the amount of the mixed organic solvent is in a range of about 80% to about 99.9% by volume based on total volume of the organic electrolytic solution.

4. The organic electrolytic solution of claim 1, wherein amount of the additive is in a range of about 0.1 part to about 1 part by volume based on total volume of the mixed organic solvent.

5. The organic electrolytic solution of claim 4, wherein the additive amount is in a range of about 0.25 part to about 1 part by volume based on total volume of said mixed organic solvent.

6. The organic electrolytic solution of claim 1, wherein the high dielectric constant solvent is selected from a group consisting of ethylene carbonate, propylene carbonate, butylene carbonate, and γ-butyrolacetone.

7. The organic electrolytic solution of claim 1, wherein the low boiling-point solvent is selected from a group consisting of dimethyl carbonate, ethylmethyl carbonate, diethyl carbonate, dipropyl carbonate, dimethoxyethane, diethoxyethane, and a fatty acid ester derivative.

8. A lithium battery, comprising:
a positive electrode
a negative electrode; and
an organic electrolytic solution comprising a lithium salt, a mixed organic solvent of a high dielectric constant solvent and a low boiling-point solvent, and an additive,
wherein the additive comprises a heterocyclic compound of Formula (1):

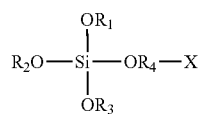

Formula 1 where $R_1$, $R_2$ and $R_3$ are each independently a C1-C10 linear or branched alkyl group, where $R_4$ is a C1-C10 linear or branched alkylene group, where X is a heterocyclic ring comprising N and O, and where a tetraalkyl orthosilicate functional group is linked to the N.

9. The lithium battery of claim 8, wherein X is derived from a compound selected from the group consisting of oxazole, isoxazole, oxazoline, oxazolanone, oxazolane, and oxazolone.

10. The lithium battery of claim 8, wherein amount of the additive is in a range of about 0.1 part to about 1 part by volume based on a total volume of the mixed organic solvent.

11. The lithium battery of claim 8, wherein the additive amount is in the range of about 0.25 part to about 1 part by volume of a total volume of the mixed organic solvent.

* * * * *